(12) United States Patent
Carpenter

(10) Patent No.: US 10,750,212 B2
(45) Date of Patent: Aug. 18, 2020

(54) DYNAMIC DIGITAL OBJECT PLACEMENT IN VIDEO STREAM

(71) Applicant: MobiTV, Inc., Emeryville, CA (US)

(72) Inventor: Cory Carpenter, Walnut Creek, CA (US)

(73) Assignee: MobiTV, Inc., Emeryville, CA (US)

( * ) Notice: Subject to any disclaimer, the term of this patent is extended or adjusted under 35 U.S.C. 154(b) by 0 days.

(21) Appl. No.: 16/133,236

(22) Filed: Sep. 17, 2018

(65) Prior Publication Data

US 2020/0092590 A1    Mar. 19, 2020

(51) Int. Cl.
*H04N 21/234* (2011.01)
*H04N 21/81* (2011.01)
*H04N 21/25* (2011.01)
*G06N 20/00* (2019.01)

(52) U.S. Cl.
CPC ....... *H04N 21/23424* (2013.01); *G06N 20/00* (2019.01); *H04N 21/251* (2013.01); *H04N 21/812* (2013.01); *H04N 21/8146* (2013.01)

(58) Field of Classification Search
CPC ......... H04N 21/23424; H04N 21/8146; H04N 21/812; H04N 21/251; G06N 20/00
See application file for complete search history.

(56) References Cited

U.S. PATENT DOCUMENTS

2008/0271070 A1 * 10/2008 Kanojia .............. H04N 7/025
2019/0332865 A1 * 10/2019 Dassa ................ G06K 9/00671

* cited by examiner

Primary Examiner — Anthony Bantamoi
(74) Attorney, Agent, or Firm — Kwan & Olynick LLP

(57) ABSTRACT

Techniques and mechanisms described herein facilitate providing dynamic digital object placement in a video stream. An exchange network for engagements within video streaming content is maintained, and a number of engagement entities and content providers are connected to the exchange network. An engagement proposal is received from an engagement entity in the exchange network, containing media assets for an engagement and proposed engagement information. Content provider requirements are also received from a content provider in the exchange network, containing content provider requirements and one or more engagement surfaces associated with a video stream. The exchange network determines that the received engagement proposal matches the received content provider requirements. Once the exchange network matches the two entities, the media assets from the engagement entity are dynamically inserted into the video stream published by the content provider by mapping the media assets to the one or more engagement surfaces.

20 Claims, 6 Drawing Sheets

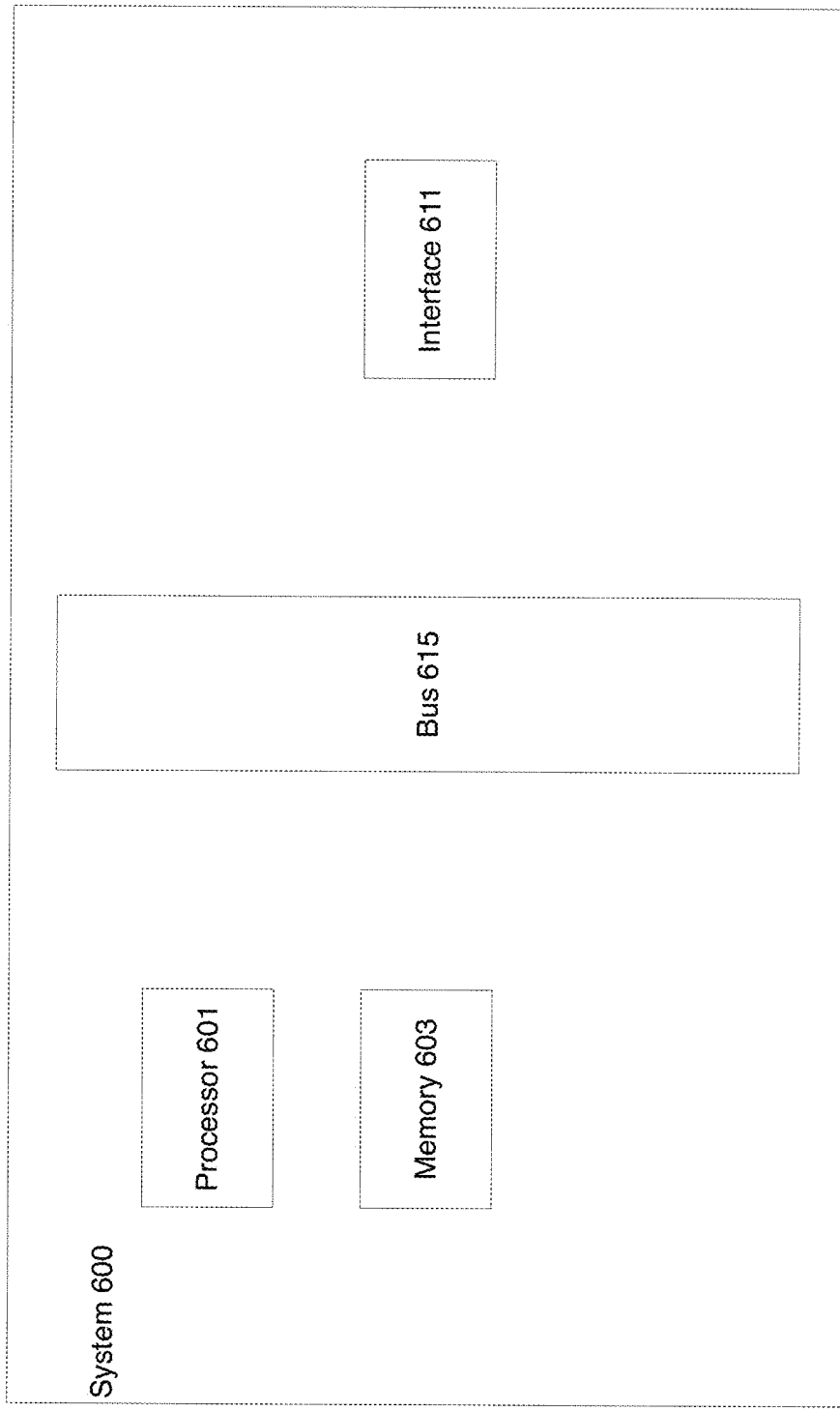

DYNAMIC DIGITAL OBJECT PLACEMENT IN VIDEO STREAM

TECHNICAL FIELD

The present disclosure relates to the provision of streaming media content, and more specifically to the placement of dynamic digital objects within video streaming content.

BACKGROUND

Within the motion picture, television, and internet media industries, product placement is a vital and successful form of advertising. Product placement typically involves placing a product name, product logo, or a product itself within a scene in a movie, television show, or other video content. This placement is done in such a way that it can be viewed by the viewer of the media content. Often, there is minimal or no interference with the rest of the video content, including any artistic or creative intent, unless merging the product placement with the artistic or creative intent is a deliberate choice of the parties involved.

Typically, product placement involves an advertiser, who provides the media asset or assets involved in the product placement and agrees to its product being placed in one or more scenes of the media content; and the publisher, who provides the media content and/or the platform for the media content, and agrees to the advertiser's product being placed within the media content.

Internet media advertisers and publishers commonly use so-called "ad exchanges", which are online, digital marketplaces for advertisers and publishers to buy and sell online advertisement space, often through real-time auctions or other such systems and mechanisms. This greatly simplifies and standardizes many aspects of online advertising, greatly reducing the time, energy, and financial resources involved in working out an individualized, negotiated agreement from the beginning between an advertiser and a publisher each time an advertiser wishes to purchase advertising space. In the case of product placement within one or more scenes of streaming video content, however, there is no similar programmatic way to facilitate the transaction and execution of placing a product or object into a video stream.

BRIEF DESCRIPTION OF THE DRAWINGS

The disclosure may best be understood by reference to the following description taken in conjunction with the accompanying drawings, which illustrate particular embodiments.

FIG. 6 illustrates an example of a system.

DESCRIPTION OF EXAMPLE EMBODIMENTS

Figure 1:
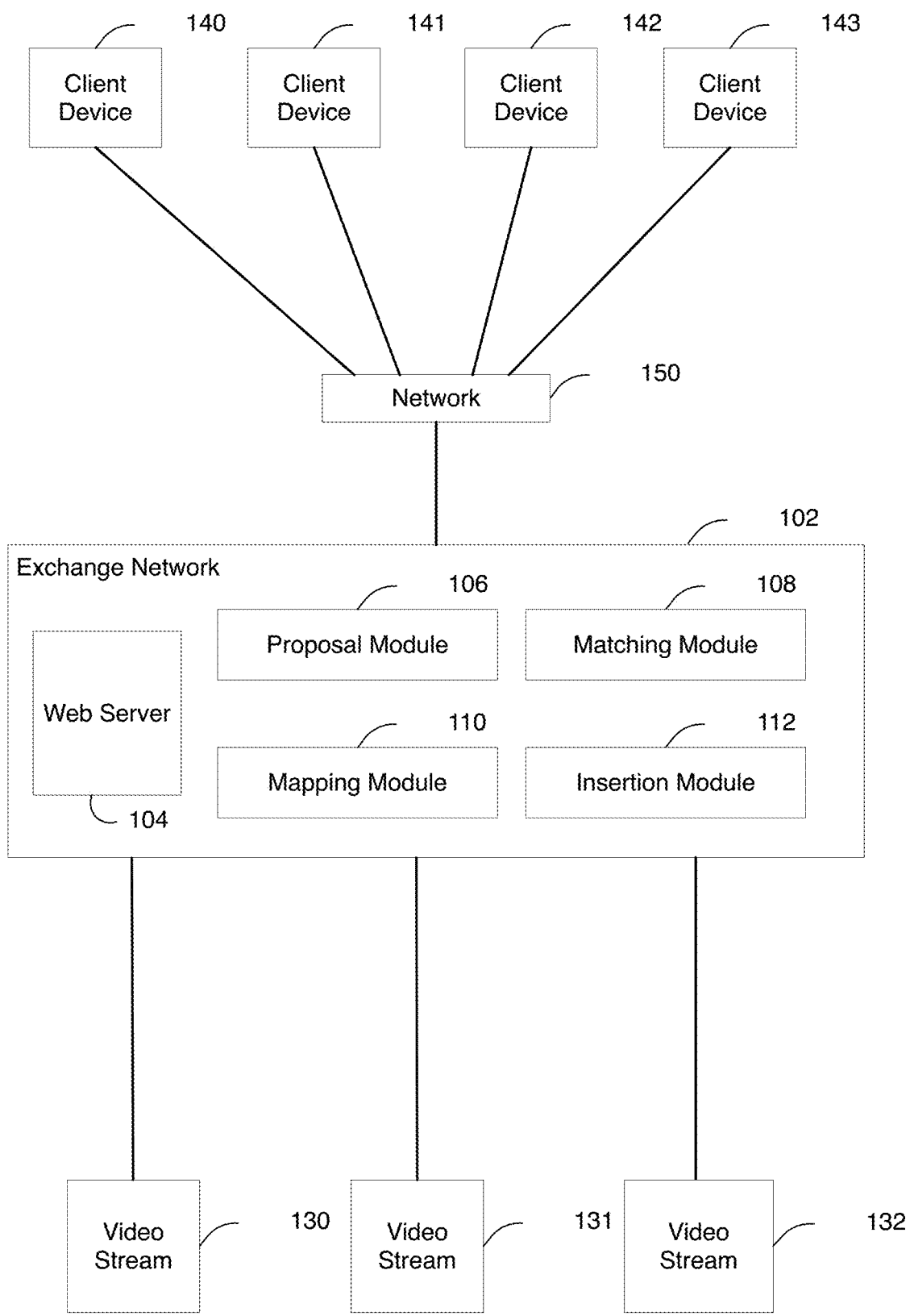
FIG. 1 illustrates an example of a system for placing dynamic digital objects within video streaming content, configured in accordance with various techniques and mechanisms of the present invention.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of particular video streams, servers, content platforms, ad exchanges, and engagement exchanges. However, it should be noted that the techniques of the present invention apply to a wide variety of different content streams, servers, and exchanges. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

Techniques and mechanisms described herein facilitate placing dynamic digital objects within video streaming content. An exchange network for engagements within video streaming content is maintained, and a number of engagement entities (or "advertisers") and content providers (or "publishers") are connected to the exchange network. An engagement proposal is received from an engagement entity in the exchange network, containing at least one or more media assets for an engagement and proposed engagement information. Content provider requirements are also received from a content provider in the exchange network, containing at least content provider requirements and one or more engagement surfaces associated with a video stream. The exchange network determines that the received engagement proposal matches the received content provider requirements along some pre-specified criteria, and the two entities are matched with each other. Once the exchange network matches the two entities, the media assets from the engagement entity are dynamically inserted into the video stream published by the content provider by mapping the media assets to the one or more engagement surfaces.

Example Embodiments

According to various embodiments, users of client devices may receive content from a content management service. The content management service may facilitate the interaction of users with various types of content. Content providers publish and provide these various types of content which may be accessed through the content management service. For instance, the content management service may provide a user interface for managing and accessing content from a number of different content sources. The interface may display content received via a cable or satellite television connection, one or more on-demand-video service providers such as Netflix or Amazon, and/or content accessible on local or network storage locations. In addition, the interface may be used to access this content on any number of content playback devices, such as televisions, laptop computers, tablet computers, personal computers, and mobile phones. At least some of the content may include live audio and/or video streams.

With today's technology, both on demand video streams and live media content streams over TV or the Internet allow for the possibilities of personal ads to be displayed to viewers. In traditional TV distributions, with ad breaks at rather regular intervals (a.k.a. "commercial breaks"), ads can be replaced at the server side, depending on the transmission region of the distribution. Special cues in the stream mark the start and end point of such ads. One standard for such cues is SCTE-35. When an encoder, or other network node, finds such cues it can choose to splice in another video source, e.g. another ad, so that the output differs from the input. In some embodiments, this can be done seamlessly such that the viewer or user of the client device does not notice the transition to the spliced video source. In some embodiments, this is referred as a SCTE-35 splice insert event. The network node system still receives and monitors the same or original input stream in order to detect later cues, including cues signaling a consecutive ad period following the ad period that is currently valid or playing.

With Internet streaming, there is an ongoing transition towards client-side ad-insertion, which allows for insertion of personal ads at the client device. Personal ads can be chosen based on a variety of factors, such as user preferences, browsing history, user profiles, geographical locations, or time of day. One standard for HTTP streaming is DASH. DASH-IF provides guidelines on how to implement client-side ad insertion.

In one DASH method, the application-driven approach, the SCTE-35 cues mentioned previously are transformed and sent to the client as emsg boxes in media segments. When a client receives such a box, it becomes informed that there is an upcoming replaceable ad period. In addition, the emsg boxes also inform the client of the duration of the upcoming ad period. An application, or app, can then contact an ad server and receive a link to an appropriate personal ad, or a series of ads, that can be played during the signaled ad period duration.

In other approaches, the system uses the HTTP Live Streaming (HLS) protocol. For such embodiments using HLS, the same mechanism can be used as described above, although with a few modifications. In such embodiments, a system will typically use ID3 tags instead of emsg boxes. Unlike emsg boxes, ID3 tags can potentially be placed early in the media segments. Thus, the client device will need to also make byte range requests to fetch the beginning of the data in the media segments. In some embodiments, the segment creator can choose to put the ID3 tags at the beginning of the media segments that follow the first ad starting point. In some embodiments, the segment creator can put the segments at the middle or end. Thus, a system can utilize sampling at regular intervals in order to detect a subsequent ad indicator after a first replacement ad or series of ads has started playing.

In present embodiments, rather than or in addition to the more traditional approaches involving ad breaks or commercial breaks at regular intervals, containing discrete replaceable ads, the core content of the video stream itself can be altered, modified, or replaced to include product placement advertising on one or more engagement surfaces within the content. With traditional approaches, SCTE-35 cues and ID3 tags are used to indicate the beginning and end of ad breaks, segments, splice points, and the like. With dynamic product insertion, in some embodiments they may be used to indicate the beginning and ending video frames of a particular engagement surface within the video content, or a splice point to insert a media asset. In some embodiments, the system detects a number of engagement indicators within the video stream indicating one or more engagement segments. Dynamically inserting the media assets into the video stream then involves inserting the media assets into the engagement segments. In some embodiments, the engagement indicator indicates the beginning of an engagement segment, and the media asset is inserted into video frames starting at the frame pointed to by the engagement indicator.

In various embodiments, if a consecutive engagement segment or engagement frame is detected, then the system inserts a media asset into the engagement surface within the frame instead of the original content in the media stream, and delays resuming fetching of the original media stream. If a consecutive engagement segment is not detected, then the system will resume fetching the media stream as the first engagement period ends. If a subsequent engagement indicator is detected in the sample, but the system has determined that the engagement period is not consecutive, then the system will resume fetching the media stream after the first engagement period ends and insert another media asset or multiple media assets into one or more engagement surfaces upon reaching the start point designated by the subsequent engagement indicator.

In some embodiments, a media stream is divided into chunks called "segments." As used herein, fetching "only a portion" refers to fetching no more than a small sample of the segments. In some embodiments, fetching "a portion" of the media stream refers to a portion of a single segment in the media stream. In other embodiments, fetching "a portion" refers to retrieving a whole segment or a series of segments. As used herein, fetching "only a portion" will not be interpreted to encompass fetching the full, or entire, media segments. In some embodiments, no part of the audio-visual media itself is needed for detecting the signaling. In such embodiments, even for encrypted content, where the Common Encryption Format is used, there are no issues since the signaling is sent in the clear, in contrast to the audio-visual data. As used herein, the terms "resuming reception" or "resuming fetching of the entire media stream" are used to mean resuming reception of the media stream with the intention of receiving and playing the full rest of the media stream or complete media segments (at least until another pause or break).

In some embodiments, a "sample," a "little bit," and a "portion" of the media stream are used interchangeably. In some embodiments, a sample can be as little as 50 bytes or as large as a few kilobytes, e.g. 10 kilobytes. In some embodiments, the client device can sample small segments, or small portions of segments, of the media stream at certain intervals during the first engagement period in order to check whether a consecutive engagement period is scheduled to play after the first engagement period. In some embodiments, decryption of the data is not needed, even if the audio-visual data is encrypted.

In various embodiments, the media stream contains one or more current engagement indicators that occur within the first original engagement period. In such embodiments, the one or more current engagement indicators indicate that engagement segments in the media stream are currently within the first original engagement period. The function for such implementations is to inform a new client tuning in to the media stream that the media stream is currently in an engagement period. In such embodiments, upon detecting an engagement indicator indicating that the media stream is currently in an engagement period, the client-side app makes a determination as to whether there is enough time to pre-fetch, prep, and insert one or more media assets before the end of the current engagement period. If a determination is made that there is time, then the app will proceed with pre-fetching, prepping, and inserting one or more media assets according to the techniques and mechanisms described herein.

In various embodiments, the techniques and mechanisms described herein may apply to various live content streaming configurations. For example, the techniques may apply to Hypertext Transfer Protocol (HTTP) streaming using HTTP Live Streaming (HLS), Dynamic Adaptive Streaming over HTTP (DASH), Smooth Streaming, and/or other such technologies. As another example, the techniques may apply to content streamed in accordance with Real-time Transport Protocol (RTP), Real Time Streaming Protocol (RTSP), and/or Transport Stream (TS) technologies.

In some embodiments, the video stream content, engagement surfaces, and/or media assets are two-dimensional (or "2D") in nature. In some embodiments, 2D file formats are used for the media assets and engagement surfaces. In such embodiments, mapping a media asset onto an engagement surface involves replacing the 2D surface of the engagement surface with the 2D media asset. In some embodiments, the system verifies that the resolution and dimensions of the 2D media asset conform to the requirements of the video stream and engagement surface. In some embodiments, the media assets and engagement surfaces are three-dimensional (3D) in nature, and 3D file formats are used for the media assets and engagement surfaces. In such embodiments, mapping a media asset onto an engagement surface involves replacing the 3D surface of the engagement surface with the 3D media asset. In some embodiments, the system verifies that the resolution, dimensions, and spatial qualities of the 3D media asset conform to the requirements of the video stream and engagement surface.

In some embodiments, the proposed engagement information that is received from the engagement entity contains one or more criteria or offers for the engagement content to be published within a video stream of a content provider. In some embodiments, the criteria includes one or more target audiences. For example, the proposed engagement information may stipulate that the audience viewing the stream must be primarily 18-24 year olds who play video games. In some embodiments, the criteria includes a proposed price for the engagement content.

In some embodiments, one or more candidate engagement surfaces are dynamically selected from the potential engagement surfaces within the video streaming content based on one or more selection criteria. In some embodiments, this dynamic selection incorporates techniques from at least one of machine learning, predictive analysis, and/or artificial intelligence methods. In some embodiments, the selection criteria includes selecting engagement surfaces that are most in demand by engagement entities.

In some embodiments, mapping the media assets to the engagement surfaces includes modifying the video stream to replace video stream content with the media assets. In some embodiments, mapping the media assets to the engagement surfaces includes generating a video overlay for the video stream, with the video overlay containing the media assets.

In various embodiments, the video stream content can take various forms, including interactive content. In some embodiments, the video stream content includes video game content. In some embodiments, dynamically inserting the one or more media assets into the video stream comprises inserting lightning or shadow elements within the video content.

These embodiments and other embodiments are described further below with reference to the figures.

FIG. 1 illustrates an example of a system, configured in accordance with various techniques and mechanisms of the present invention. The system shown in FIG. 1 is configured for facilitating product placement within video stream in connection with a plurality of client devices, some of which are associated with engagement entities seeking to promote products, and some of which are associated with content providers seeking to attract advertisers to their video stream content. The system includes an exchange network 102 in communication with a plurality of client devices 140-143 and configured to receive engagement proposals and content provider requirements from client devices with respect to video streams 130-132. The exchange network 102 is configured to match engagement entities and content providers associated with client devices 140-143 via the network 150.

In particular embodiments, the exchange network 102 may be configured to provide placement of dynamic objects within a variety of on-demand media content. In some embodiments, this content may include, but is not limited to VOD (video on demand) streaming content, including Netflix and Hulu Plus, as well as live streaming media content channels such as television channels and sports broadcasts. For example, the exchange network 102 may be configured to match content provider Netflix with a shoe company such as Adidas in order to place Adidas shoes within certain scenes of original Netflix streaming series content. In some embodiments, a content provider may provide any source of video and/or audio content that is available on a streaming basis, whether live or on demand.

According to various embodiments, a client device associated with an engagement entity may send an engagement proposal to exchange network 102 via the network 150. For instance, the engagement entity may wish to promote its shoe brand via a product placement within a television show. The engagement proposal may be received at the web server 104. The web server may transmit a response to the client device that includes information such as how to proceed with the matching process within the exchange network, or inform the engagement entity that one or more content provider matches has been found. In some embodiments, the engagement proposal includes details of the proposed engagement and engagement content, as well as one or more media assets intended to be used in the product placement. An example of a media asset may be an image of the logo of a shoe brand.

In some embodiments, a content provider may send content provider requirements to exchange network 102 via the network 150. For instance, the content provider may wish to receive money in exchange for agreeing to insert one or more dynamic objects as product placement within a video stream of the content provider's television show. The content provider requirements may be received at the web server 104. The web server may transmit a response to the client device that includes information such as how to proceed with the matching process within the exchange network, or inform the content provider that one or more engagement entity matches has been found. In some embodiments, the content provider requirements include one or more stipulations that engagement content must conform to in order to be eligible for product placement within the video stream. For example, a content provider may stipulate that no political content or adult-oriented content may appear as product placement within the video stream.

In particular embodiments, the web server 104 may transmit and/or receive one or more messages to other modules within the on-demand exchange network 102. For instance, the web server 104 may communicate with the mapping module 110 to identify the media assets and engagement surfaces involved and/or receive stream description information for the video stream in question.

According to various embodiments, each video stream media content may be received as input data by the exchange network 102. For instance, the data may be received from a content source such as a satellite teleport, or over an IP network using UDP multicast. The media may have one or more video streams, one or more audio streams, and/or one or more subtitle streams, any or all of which may be encapsulated in one or more MPEG-2 transport stream. The origin video may be encoded at high quality using a video coding standard such as HEVC/H.265, AVC/H-264 or MPEG-2. Using multicast, the same source can be distributed to multiple encoders that can produce variants of different quality and bitrate. Each encoder can make one or more variants. Another possible configuration is one in which source data is made available to multiple encoders using individual connections from the encoders towards a common server, such as an HTTP server, which provides the video stream as a continuous or segmented stream.

The client devices 140-146 may communicate with the exchange network 102 via the network 150. According to various implementations, a client device may be a mobile computer, a laptop computer, a desktop computer, a set top box, a smart television, or any other network-enabled device capable of receiving content for presentation.

According to various embodiments, the network 150 may be any network or combination of networks configured to transmit information. For instance, the network 150 may include a wide area network (WAN), a local area network (LAN), a metropolitan area network (MAN), the Internet, a cellular network, a satellite network, or any other suitable type of network.

In some embodiments, the proposal module 106 in exchange network 102 receives engagement proposals, processes them, and sends them on to the matching module 108. In some embodiments, the matching module 108 matches one or more engagement entities with one or more content providers based on matching criteria. In some embodiments, the mapping module 110 maps one or more media assets from an engagement entity on to one or more engagement surfaces within video streams, and handles ensuring that submitted media assets conform to the correct dimension of the engagement surface and other requirements. In some embodiments, the insertion module 112 dynamically inserts the scene containing the product placement into the video stream.

Figure 2:
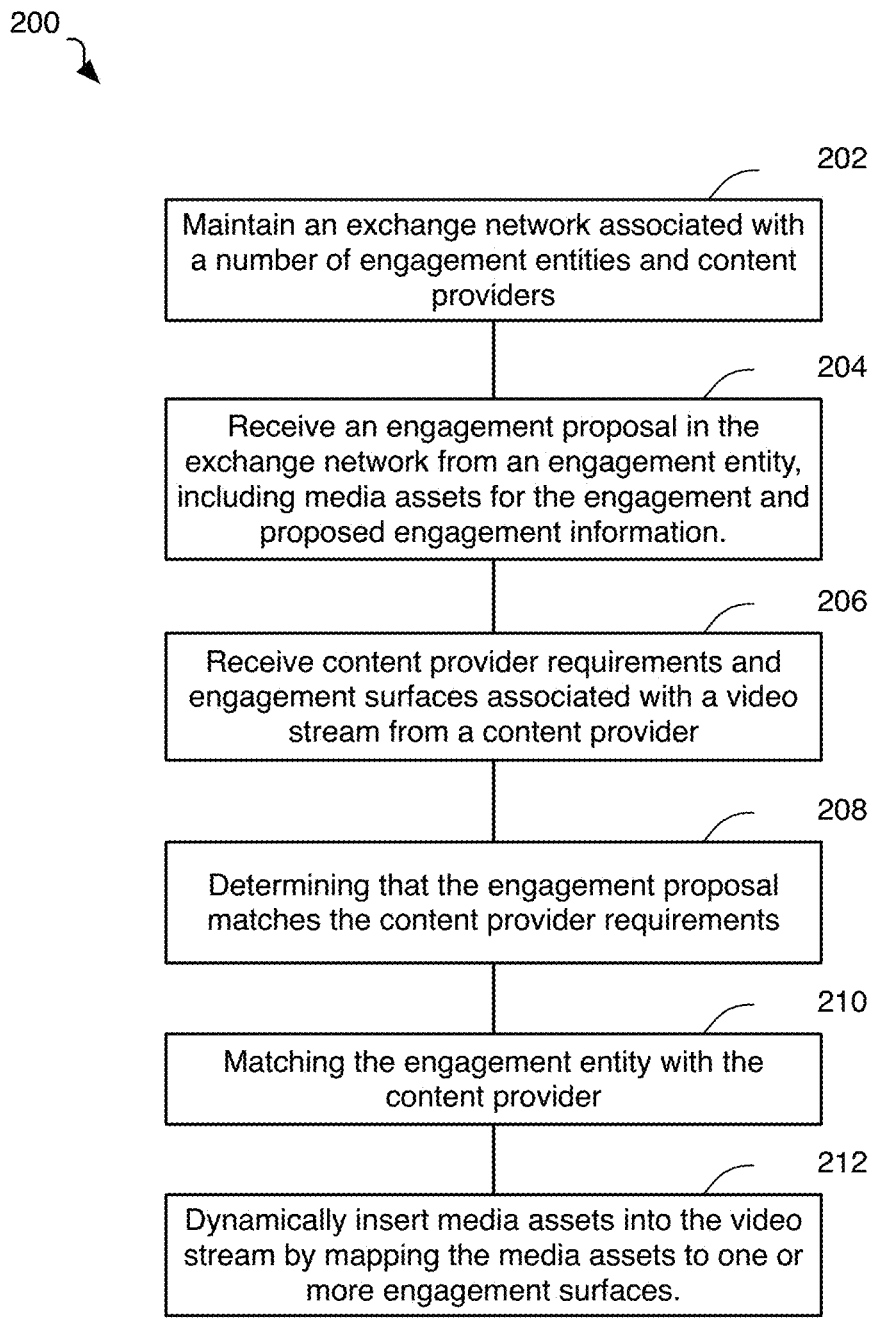
FIG. 2 illustrates an example of a method for placing dynamic digital objects within video streaming content, performed in accordance with various techniques and mechanisms of the present invention.

FIG. 2 illustrates an example of a method 200 for providing product placement within a video stream, performed in accordance with various techniques and mechanisms of the present invention. The method 200 may be performed at an exchange network, such as the exchange network shown in FIG. 1.

At block 202, the system maintains an exchange network 102 associated with a number of engagement entities and content providers. In some embodiments, the exchange network is similar to an ad exchange that enables the placement of advertisements on websites. Such ad exchanges connect advertisers who wish to advertise their products or services online with website publishers who wish to receive money for allowing advertisements to appear on their websites. An example of a prior system involving such an ad exchange is illustrated in FIG. 3.

Figure 3:
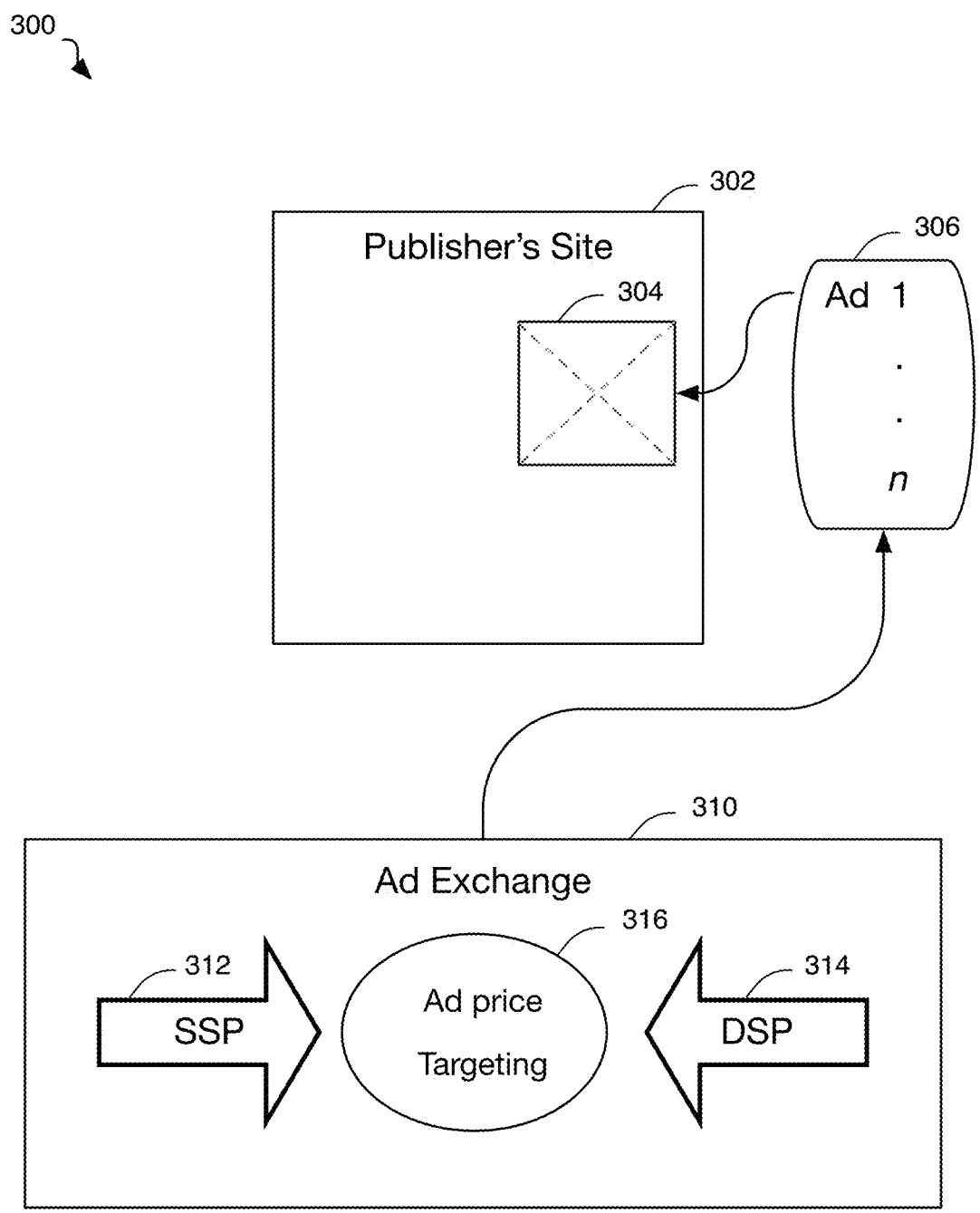
FIG. 3 illustrates an example of a prior system for placing advertisements within web content using an ad exchange.

FIG. 3 illustrates an example of a prior system 300 for placing advertisements within web content using an ad exchange. Within a publisher's site 302, a portion of a webpage, such as the front page, is selected by the publisher as an advertising surface 304. One or more ads 306 may appear within the advertising surface if approved by the publisher. The ads are selected and approved to appear by the publisher through an ad exchange 310. Within the ad exchange 310, a supply side publisher (or "SSP") 312 represents an advertiser seeking to place its advertisement within a suitable website, while a domain side publisher (or "DSP") 314 represents a website publisher seeking to enter into an agreement with an advertiser for an ad to be placed within its website. The SSP 312 submits an advertising proposal containing at least a desired ad price or ad range and a desired target audience, and the DSP 314 submits one or more publishing requirements, such as prices for ads to be placed and content restrictions. These criteria 316 are used by the ad exchange 310 to facilitate a match between the SSP 312 and the DSP 314. The two parties then enter into an agreement for placing the SSP's ad in DSP's website, and the ad is dynamically inserted into the publisher's site 302 by mapping SSP's media asset to the advertising surface 304.

Figure 4:
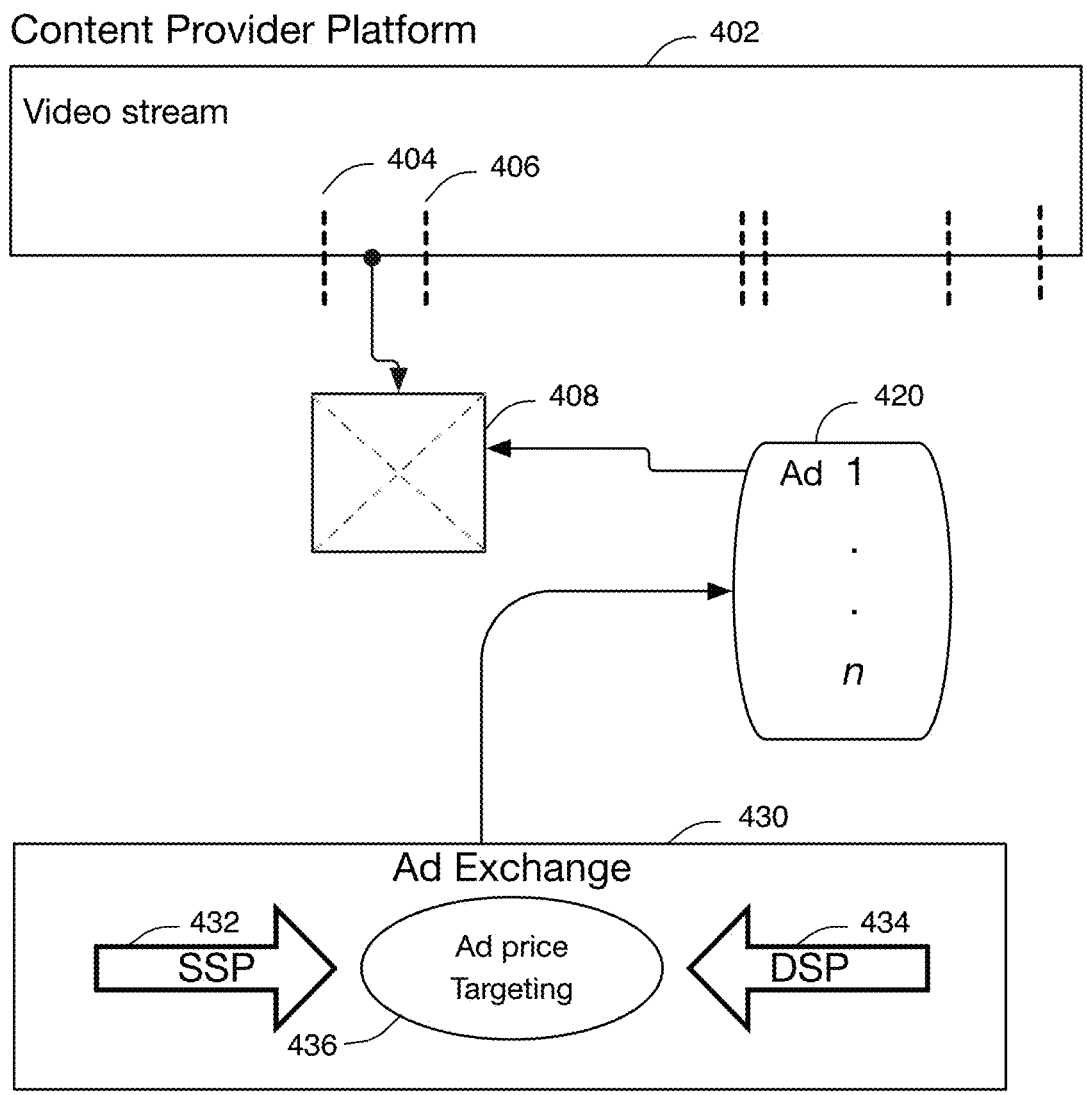
FIG. 4 illustrates an example of a prior system for placing advertisements within video streaming content.

FIG. 4 illustrates an example of a prior system for placing advertisements within video streaming content. As in FIG. 3, an ad exchange 430 facilitates a match between SSP 432 and DSP 434 based on criteria 436. In this situation, SSP 432 is an advertiser seeking to place a video advertisement within a commercial break of a video stream 402, and DSP 434 is a content provider whose platform broadcasts the video stream. Multiple ad indicators 404 and 406 are identified within the video stream using SCTE-35 cues or ID3 tags. Ad indicator 404 is identified as the beginning of a commercial break, and ad indicator 406 is identified as the end of a commercial break. Advertising period or advertising segment 408 is identified as available for multiple advertisements 420. The ad exchange 430 facilitates the placement of the advertisements 420 within the advertising period 408.

Figure 5:
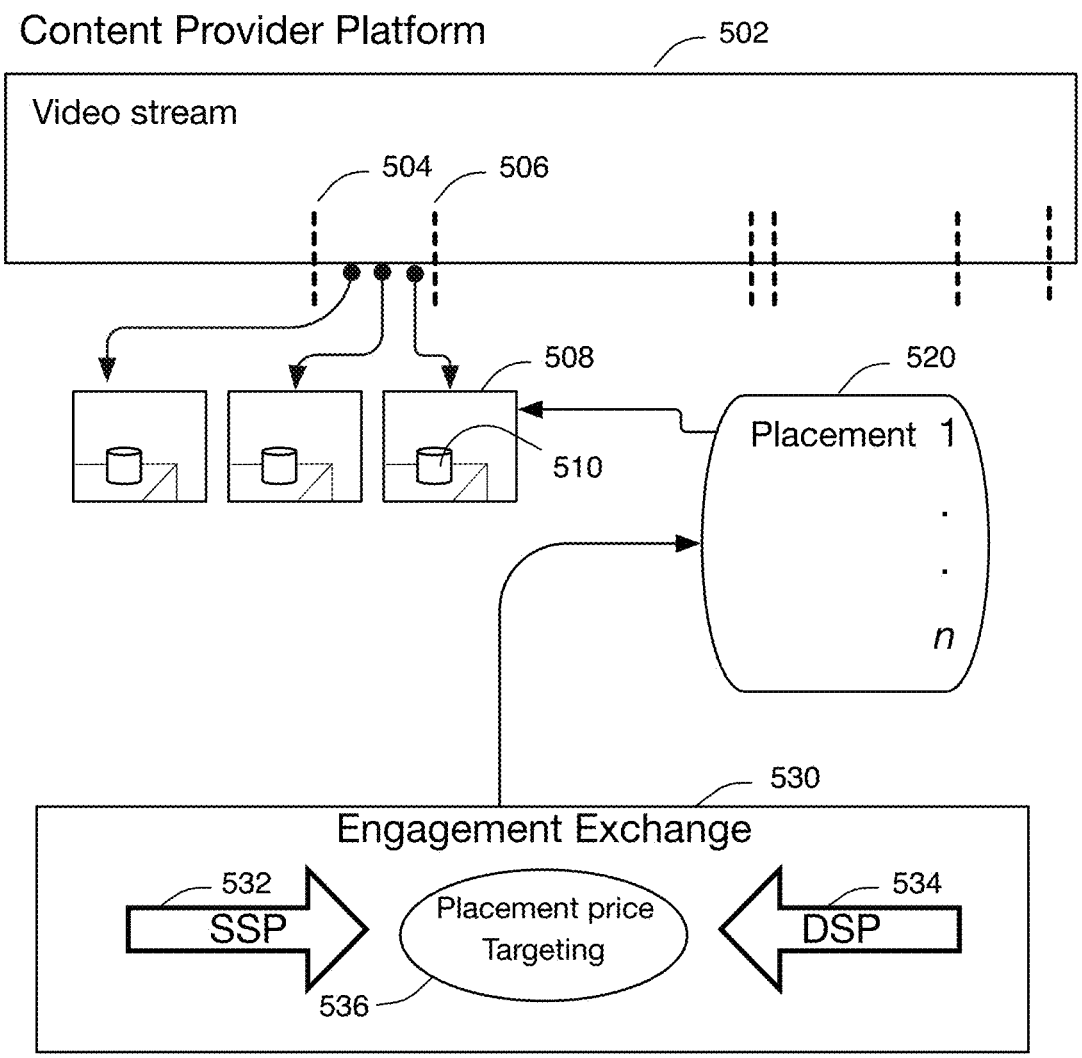
FIG. 5 illustrates an example of a system for placing dynamic digital objects within video streaming content, performed in accordance with various techniques and mechanisms of the present invention.

FIG. 5 illustrates an example of a system for placing dynamic digital objects within video streaming content, performed in accordance with various techniques and mechanisms of the present invention. A content provider broadcasts a video stream 502 on the provider's platform. Engagement indicators 504 and 506 are identified within the video stream. In some embodiments, SCTE-35 or ID3 tags are used to designate the engagement indicators. In contrast to FIG. 4, where the indicators were used to identify commercial breaks for placing advertisements in, here the engagement indicators 504 and 506 are used to identify beginning and ending frames 508 where dynamic objects can be mapped onto engagement surfaces 510 for one or more product placements 520. Similar to the ad exchanges in FIG. 3 and FIG. 4, an engagement exchange 530 within the exchange network 102 facilitates providing dynamic objects as product placement within the video stream. In some embodiments, the SSP or supply side publisher, also referred to as the engagement entity 532, sends an engagement proposal through the engagement exchange 530, including at least proposed engagement information and one or more media assets. In some embodiments, the proposed engagement information includes information on a desired placement price or placement price range, and information on desired audiences to be targeted. The DSP 534 or demand side publisher, also referred to as the content provider, submits content provider requirements through the engagement exchange 530. The engagement exchange 530 matches the SSP 532 and DSP 534 when the criteria 536 provides an optimal match compared to other SSPs and DSPs within the engagement exchnge 530. Upon a match being identified by the engagement exchange 530, an agreement is entered into between the SSO 532 and DSP 534, and media assets of the SSP are mapped onto one or more engagement surfaces 510 within the frames 508 indicating segments of the video stream available for product placement. The mapped surfaces are then dynamically inserted into the video stream.

Returning to FIG. 2, the exchange network 102 that is maintained by the system 200 can be seen as illustrated by the engagement exchange 530 in FIG. 5. The exchange network 102 is associated with a number of engagement entities and content providers, which connect to the exchange network 102 via client devices.

At block 204, system 200 receives an engagement proposal in the exchange network from an engagement entity. In some embodiments, the engagement proposal includes media assets for the engagement and proposed engagement information. In some embodiments, the media assets are dynamic objects in a file format capable of being identified, read, and processed by system 200 and/or the exchange network 102. In some embodiments, the media assets are two-dimensional and the file format is one for two-dimensional objects. In other embodiments, the media assets are three-dimensional and the file format is one for three-dimensional objects.

At block 206, system 200 receives content provider requirements and engagement surfaces associated with a video stream from a content provider. In some embodiments, content provider requirements can include stipulations about the kinds of product placements the content providers wishes to agree to, or wishes to not include. In some embodiments, content provider requirements include restrictions on content in various ways. For example, the content provider requirements can specify that the content provider does not wish to include age-restricted content, product placement involving smoking or cigarette brands, product placement involving adult-oriented content or pornography, and so on.

At block 208, system 200 determines that the engagement proposal matches the content provider requirements. In some embodiments, system 200 determines a match based on one or more matching criteria. In some embodiments, matching criteria includes the engagement entity and the content provider both agreeing on a price or price range for the product placement. In some embodiments, matching criteria includes the engagement entity and the content provider both specifying a same or similar target audience for the product placement and/or the video stream. In some embodiments, system 200 ranks best matches from a number of choices, and selects the best match from within the ranked matches.

At block 210, system 200 matches the engagement entity with the content provider. In some embodiments, both the engagement entity and the content provider are notified of the match within the exchange network 102. In some embodiments, an agreement between the two parties for the product placement within the video stream is facilitated.

At block 212, system 200 dynamically inserts media assets into the video stream. In some embodiments, the dynamic insertion is done by mapping the media assets to one or more engagement surfaces. In some embodiments, mapping the media assets includes verifying that the media assets fit the requirements for being mapped onto the engagement surfaces. For example, if an engagement surface is a 4×3 inch flat surface, then the media asset must also be 4×3 in order to be mapped onto the engagement surface. In some embodiments, if the media asset does not conform to the requirements, then the engagement entity is notified and given the option to correct and resubmit one or more media assets. In some embodiments, mapping requirements include being in the correct file format that can be recognized by the exchange network and can facilitate the product placement process.

FIG. 6 illustrates one example of a computing device. According to particular embodiments, a system 600 suitable for implementing particular embodiments of the present invention includes a processor 601, a memory 603, an interface 611, and a bus 615 (e.g., a PCI bus or other interconnection fabric) and operates as a streaming server. When acting under the control of appropriate software or firmware, the processor 601 is responsible for modifying and transmitting live media data to a client. Alternately, or additionally, the system 600 may be configured as a client device operable to receive and present media content items. Various specially configured devices can also be used in place of a processor 601 or in addition to processor 601. The interface 611 is typically configured to send and receive data packets or data segments over a network.

Particular examples of interfaces supported include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control communications-intensive tasks such as packet switching, media control and management.

Although a particular server is described, it should be recognized that a variety of alternative configurations are possible. For example, some modules such as a report and logging module and a monitor may not be needed on every server. Alternatively, the modules may be implemented on another device connected to the server. In another example, the server may not include an interface to an abstract buy engine and may in fact include the abstract buy engine itself. A variety of configurations are possible.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

The invention claimed is:

1. A method for providing dynamic object placement in a video stream, comprising:
   maintaining an exchange network, wherein the exchange network is associated with a plurality of engagement entities and a plurality of content providers;
   receiving, from an engagement entity in the plurality of engagement entities, an engagement proposal in the exchange network, the engagement proposal comprising one or more media assets for the engagement and proposed engagement information;
   receiving, from a content provider in the plurality of content providers, one or more content provider requirements and one or more engagement surfaces associated with a video stream;
   determining that a client is starting a streaming session in a middle section of the video stream;
   determining that the middle section of the video stream is within an engagement period;
   determining that there is sufficient time to insert the one or more media assets into the engagement period of the middle section of the video stream before the end of the engagement period;
   determining that the engagement proposal matches the content provider requirements;
   matching the engagement entity with the content provider; and
   dynamically inserting, based on the determining that there is sufficient time to insert the one or more media assets, the one or more media assets into the video stream by mapping the media assets to the one or more engagement surfaces.

2. The method recited in claim 1, further comprising:
   detecting a plurality of engagement indicators within the video stream indicating one or more engagement segments, wherein dynamically inserting the one or more media assets into the video stream comprises inserting the one or more media assets into the one or more engagement segments.

3. The method recited in claim 1, wherein the video stream comprises VOD (video on demand) content.

4. The method recited in claim 1, wherein the video stream, engagement surfaces, and media assets are two-dimensional.

5. The method recited in claim 1, wherein the proposed engagement information comprises one or more target audiences and a proposed price.

6. The method recited in claim 1, further comprising:
   dynamically selecting one or more candidate engagement surfaces from the one or more engagement surfaces based on one or more selection criteria, wherein the dynamically selecting incorporates techniques from at least one of: machine learning, predictive analytics, and artificial intelligence.

7. The method recited in claim 6, wherein the one or more selection criteria comprises selecting one or more engagement surfaces that are most in demand by engagement entities.

8. The method recited in claim 1, wherein mapping the media assets to the one or more engagement surfaces comprises at least one of: modifying the video stream to replace video stream content with the media assets, and generating a video overlay for the video stream, the video overlay containing the media assets.

9. The method recited in claim 1, wherein the video stream comprises video game content.

10. The method recited in claim 1, wherein dynamically inserting the one or more media assets into the video stream comprises inserting lighting or shadow elements within the video stream.

11. A system comprising:
    a communications interface configured to communicate with media and ad servers over a network; and
    a processor configured to:
      maintain an exchange network, wherein the exchange network is associated with a plurality of engagement entities and a plurality of content providers;
      receive, from an engagement entity in the plurality of engagement entities, an engagement proposal in the exchange network, the engagement proposal comprising one or more media assets for the engagement and proposed engagement information;
      receive, from a content provider in the plurality of content providers, one or more content provider requirements and one or more engagement surfaces associated with a video stream;
      determine that a client is starting a streaming session in a middle section of the video stream;
      determine that the middle section of the video stream is within an engagement period;
      determine that there is sufficient time to insert the one or more media assets into the engagement period of the middle section of the video stream before the end of the engagement period;
      determine that the engagement proposal matches the content provider requirements;
      match the engagement entity with the content provider; and
      dynamically insert, based on the determining that there is sufficient time to insert the one or more media assets, the one or more media assets into the video stream by mapping the media assets to the one or more engagement surfaces.

12. The system recited in claim 11, wherein the processor is further configured to:
    detect a plurality of engagement indicators within the video stream indicating one or more engagement segments, wherein dynamically inserting the one or more media assets into the video stream comprises inserting the one or more media assets into the one or more engagement segments.

13. The system recited in claim 11, wherein the proposed engagement information comprises one or more target audiences and a proposed price.

14. The system recited in claim 11, wherein the processor is further configured to:
    dynamically select one or more candidate engagement surfaces from the one or more engagement surfaces based on one or more selection criteria, wherein the dynamically selecting incorporates techniques from at least one of: machine learning, predictive analytics, and artificial intelligence.

15. The system recited in claim 14, wherein the one or more selection criteria comprises selecting one or more engagement surfaces that are most in demand by engagement entities.

16. The system recited in claim 11, wherein mapping the media assets to the one or more engagement surfaces comprises at least one of: modifying the video stream to replace video stream content with the media assets, and generating a video overlay for the video stream, the video overlay containing the media assets.

17. A non-transitory computer readable medium having instructions stored thereon for performing a method, the method comprising:
- maintaining an exchange network, wherein the exchange network is associated with a plurality of engagement entities and a plurality of content providers;
- receiving, from an engagement entity in the plurality of engagement entities, an engagement proposal in the exchange network, the engagement proposal comprising one or more media assets for the engagement and proposed engagement information;
- receiving, from a content provider in the plurality of content providers, one or more content provider requirements and one or more engagement surfaces associated with a video stream;
- determining that a client is starting a streaming session in a middle section of the video stream;
- determining that the middle section of the video stream is within an engagement period;
- determining that there is sufficient time to insert the one or more media assets into the engagement period of the middle section of the video stream before the end of the engagement period;
- determining that the engagement proposal matches the content provider requirements;
- matching the engagement entity with the content provider; and
- dynamically inserting, based on the determining that there is sufficient time to insert the one or more media assets, the one or more media assets into the video stream by mapping the media assets to the one or more engagement surfaces.

18. The non-transitory computer readable medium of claim 17, the method further comprising:
- detecting a plurality of engagement indicators within the video stream indicating one or more engagement segments, wherein dynamically inserting the one or more media assets into the video stream comprises inserting the one or more media assets into the one or more engagement segments.

19. The non-transitory computer readable medium of claim 17, wherein the proposed engagement information comprises one or more target audiences and a proposed price.

20. The non-transitory computer readable medium of claim 17, the method further comprising:
- dynamically selecting one or more candidate engagement surfaces from the one or more engagement surfaces based on one or more selection criteria, wherein the dynamically selecting incorporates techniques from at least one of: machine learning, predictive analytics, and artificial intelligence.

* * * * *